United States Patent
Geng et al.

(10) Patent No.: US 8,571,069 B2
(45) Date of Patent: Oct. 29, 2013

(54) METHOD AND DEVICE FOR SENDING UPLINK BURST DATA IN PASSIVE OPTICAL NETWORK SYSTEM

(75) Inventors: Dongyu Geng, Shenzhen (CN); Dongning Feng, Shenzhen (CN); Jing Li, Shenzhen (CN); Raymond W. K. Leung, Shenzhen (CN); Frank Effenberger, Colts Neck, NJ (US)

(73) Assignee: Huawei Technologies Co., Ltd., Shenzhen (CN)

( * ) Notice: Subject to any disclaimer, the term of this patent is extended or adjusted under 35 U.S.C. 154(b) by 271 days.

(21) Appl. No.: 12/973,639

(22) Filed: Dec. 20, 2010

(65) Prior Publication Data

US 2011/0097076 A1 Apr. 28, 2011

Related U.S. Application Data

(63) Continuation of application No. PCT/CN2009/072290, filed on Jun. 16, 2009.

(30) Foreign Application Priority Data

| | | |
|---|---|---|
| Jun. 19, 2008 | (CN) | 2008 1 0068007 |
| Nov. 21, 2008 | (WO) | PCT/CN2008/073140 |
| Mar. 2, 2009 | (CN) | 2009 1 0008103 |

(51) Int. Cl.
*H04B 10/00* (2013.01)

(52) U.S. Cl.
USPC .......................................................... 370/503

(58) Field of Classification Search
None
See application file for complete search history.

(56) References Cited

U.S. PATENT DOCUMENTS

| | | | |
|---|---|---|---|
| 7,818,389 B1 * | 10/2010 | Chiang et al. | 709/212 |
| 2002/0120758 A1 | 8/2002 | Chang | |
| 2002/0171895 A1 * | 11/2002 | Chang | 359/168 |
| 2004/0202470 A1 | 10/2004 | Lim et al. | |
| 2004/0208631 A1 | 10/2004 | Song et al. | |
| 2005/0271053 A1 | 12/2005 | Nuyen et al. | |
| 2007/0127923 A1 | 6/2007 | Dalton et al. | |
| 2008/0022143 A1 | 1/2008 | Scouten et al. | |

FOREIGN PATENT DOCUMENTS

| | | |
|---|---|---|
| CN | 1536812 A | 10/2004 |
| CN | 1848731 A | 10/2006 |
| WO | WO 2007/113461 A1 | 10/2007 |

OTHER PUBLICATIONS

Written Opinion of the International Searching Authority dated Mar. 12, 2009 in connection with International Patent Application No. PCT/CN2008/073140.

Written Opinion of the International Searching Authority dated Oct. 1, 2009 in connection with International Patent Application No. PCT/CN2009/072290.

(Continued)

*Primary Examiner* — John Blanton
*Assistant Examiner* — Alan Lindenbaum

(57) ABSTRACT

A method for sending uplink burst data in a passive optical network (PON) system includes: sending a synchronization pattern of the uplink burst data, the synchronization pattern being of a length, which is an integer multiple of 66 bits, and being formed by connection of 66-bit unit gene blocks; sending a burst delimiter (BD) of the uplink burst data; sending a forward error correction (FEC)-protected data in the uplink burst data; and sending an end of burst (EOB) delimiter of the uplink burst data. The technical solutions in the embodiments allow the use of a less complex equalizer at the reception end of a high-speed PON system.

2 Claims, 5 Drawing Sheets

(56) References Cited

OTHER PUBLICATIONS

Office Action dated Nov. 11, 2010 in connection with Korea Patent Application No. 10-2009-0054227.
International Search Report dated Oct. 1, 2009 in connection with International Patent Application No. PCT/CN2009/072290.
International Search Report dated Mar. 12, 2009 in connection with International Patent Application No. PCT/CN2008/073140.
Hui He, et al., "Forward Error Correction Application in EPON", Optical Communication Technology, vol. 27, No. 105, Jun. 2003, p. 12-14.
"10G EPON Upstream Synchronizer Performance", Huawei, IEEE P802.3av Task Force, May 1, 2008, p. 1-4.
Jeff Mandin, "Framework for Upstream Synchronization and Alignment", 802.3av Framing adhoc, Feb. 2007, 24 pages.
Office Action dated Nov. 8, 2012 in connection with U.S. Appl. No. 13/473,166.
Notice of Reasons for Rejection dated Mar. 27, 2012 in connection with Japanese Patent Application No. 2009-145215, 5 pages.
Supplementary European Search Report dated Nov. 18, 2011 in connection with European Patent Application No. EP 09 76 5397.
Toshiaki Mukojima, "Backward Compatibility and Co-existence for 10Gb/s EPON", Oki Electric Industry Co., Ltd., IEEE 802.3 10Gb/s PHY for EPON Study Group, Jul. 16-21, 2006, 4 pages.
Frank Effenberger, et al., "FEC Synchronization and Framing", Jan. 15, 2007, 26 pages.
Partial Translation of Office Action dated Aug. 24, 2011 in connection with Chinese Patent Application No. 200910008103.1.
"10G EPON Upstream Synchronizer Performance", Huawei, May 1, 2008, 4 pages.
Notice of Reasons for Rejection dated Jan. 17, 2012 in connetcion with Japanese Patent Application No. 2009-145215.
European Search Report dated Jan. 31, 2013 in connetcion with European Patent Application No. EP 12 19 7953.
Office Action dated Aug. 16, 2013 in connetcion with U.S. Appl. No. 13/473,166.

\* cited by examiner

| | 66-bit gene block |
|---|---|
| Gene 1 | 101111110100000010000110001010011110100011001001011011101100011010 |
| Gene 2 | 101010011110100011100100101101110110011010101011110000010000011000 |
| Gene 3 | 100110011110100011100100101101110110011010101011110000010000011000 |
| Gene 4 | 100101011110100011100100101101110110011010101011110000010000011000 |
| Gene 5 | 101000111101000111001001011101110110011010101011110000010000011000 |
| Gene 6 | 101001111010001110010010101011101100110101011111011000001000011000 |
| Gene 7 | 101001111010001110010010110111011001101010011111011000001000011000 |
| Gene 8 | 101001111010000110010010110111101100110101011111100000010000011000 |
| Gene 9 | 101001111010001110010010110111011001101010111111010000001000011000 |

METHOD AND DEVICE FOR SENDING UPLINK BURST DATA IN PASSIVE OPTICAL NETWORK SYSTEM

CROSS-REFERENCE TO RELATED APPLICATIONS

This application is a continuation of International Application No. PCT/CN2009/072290, filed on Jun. 16, 2009, which claims priority to Chinese Patent Application No. 200810068007.1, filed on Jun. 19, 2008, and to Chinese Patent Application No. 200910008103.1, filed on Mar. 2, 2009, and to International Application No. PCT/CN2008/073140, filed on Nov. 21, 2008, all of which are hereby incorporated by reference in their entireties.

TECHNICAL FIELD

The present invention relates to the field of Passive Optical Network (PON) technologies, and in particular to a method and device for sending uplink burst data in a PON.

BACKGROUND

The PON becomes a perfect optical access technology because of its advantages of being easy to maintain, a high bandwidth, a low cost, etc., which is an ideal physical platform to which various services of voice, data, video, etc., gain an integrated access through a single platform. The PON technology is an optical fiber access technology of point-to-multipoint (P2MP). The PON including an optical line terminal (OLT), an optical network unit (ONU) and an optical distribution network (ODN) takes advantage of a passive splitter/coupler in the ODN to dispense with an element capable of amplification and relaying.

Due to the use of a point-to-multipoint topology for the PON, a point-to-multipoint multiple access protocol has to be adopted to enable numerous ONUs to share the OLT and an optical fiber backbone. As stipulated in the PON system, the direction of data from the OLT to the ONU is referred to as the downlink direction and the direction from the ONU to the OLT is referred to as the uplink direction. Currently, the widely applied uplink and downlink transmission modes of the PON system involve the use of a broadcast mode of time division multiplexing (TDM) in the PON downlink and the use of an access mode of time division multiple access (TDMA) in the uplink.

Unlike the conventional point-to-point consecutive communication mode, a multipoint-to-point burst communication mode is adopted in the PON uplink. The uplink channel is shared in the TDMA access mode for PON uplink transmission. The OLT can allocate different time slots to the respective ONUs, each of which can only transmit its own data information block in the timeslot assigned by the OLT.

Because the different ONUs are at different distances from the OLT end in the PON system, signals received at the OLT end from the different ONUs also have different intensities. Therefore upon reception at the OLT of a burst data frame from the ONU, the OLT reception end has to perform an automatic gain control (AGC) and a clock data recovery (CDR) by utilizing a synchronization pattern (a preamble) in the received burst frame, and then the OLT can matches a burst delimiter (BD) with the received burst frame and know from the match the starting location of data in the received burst frame to thereby receive the data.

A burst frame transmitted in the uplink of the existing PON system is structured in a way that a binary sequence of "1010 . . . " (a hexadecimal sequence of "0x55 . . . ") with alternating zeros and ones is defined as a current synchronization pattern which is used for the OLT to perform the AGC and the clock recovery on a received burst frame. It was identified in practice that the spectrum of the synchronization pattern signal is concentrated at high frequency components, which might be adverse to the use of a less complex equalizer at the OLT reception end. Furthermore, a frequently transition may result in the incapability of an existing peak detector to detect an actual peak of a received signal and hence possibly in degraded sensitivity of a receiver.

SUMMARY

Various embodiments of the present invention provide a method for providing uplink burst data in a PON system in which spectrum component of a synchronization pattern are relatively uniformly distributed throughout the spectrum interval to thereby allow the use of a relatively simple equalizer at the reception end of the high-speed PON system.

An embodiment of the present invention provides a method for sending uplink burst data in a PON system, where the method includes:
sending a synchronization pattern of the uplink burst data, the length of the synchronization pattern is an integer multiple of 66 bits and the synchronization pattern is formed by connecting 66-bit unit gene blocks;
sending a burst delimiter (BD) of the uplink burst data;
sending forward error correction (FEC) protected data in the uplink burst data; and
sending an end of burst (EOB) delimiter of the uplink burst data.

Also an embodiment of the present invention further provides a device for providing uplink burst data in a PON system, where the device includes:
a unit adapted to provide a synchronization pattern of the uplink burst data, the length of the synchronization pattern is an integer multiple of 66 bits and the synchronization pattern is formed by connecting 66-bit unit gene blocks;
a unit adapted to provide a BD of the uplink burst data;
a unit adapted to provide FEC-protected data in the uplink burst data; and
a unit adapted to provide an EOB delimiter of the uplink burst data.

Furthermore the present invention further provides a signal including a bit stream, the signal being uplink burst data in a PON system, in which the signal includes a synchronization pattern, a BD, FEC-protected data and an EOB delimiter, which are formed by end-to-end connection of 66-bit unit gene blocks, and the signal is of a length which is an integer multiple of 66 bits.

An embodiment of the present invention further provides a method for sending uplink burst data in a PON, where the method includes:
sending a synchronization pattern of the uplink burst data, the length of the synchronization pattern is an integer multiple of 32 bits and the synchronization pattern is formed by connecting 32-bit unit gene blocks;
sending a burst delimiter BD;
sending a burst overhead, which is adapted to detect bit-error-ratio, an ONU identifier, and a real time state report of an ONU;
sending Transmission Convergence overhead; and
sending a payload.

An embodiment of the present invention further provides a device for sending uplink burst data in a PON, where the device includes:

a synchronization pattern sending unit, adapted to send a synchronization pattern of the uplink burst data, the length of the synchronization pattern is an integer multiple of 32 bits and the synchronization pattern is formed by connecting 32-bit unit gene blocks;

a BD sending unit, adapted to send a BD;

a burst overhead sending unit, adapted to send a burst overhead, which is adapted to detect bit-error-ratio, an optical network unit (ONU) identifier, and a real time state report of an ONU;

a transmission convergence overhead sending unit, adapted to send a transmission convergence overhead; and a GTC payload sending unit, adapted to send a payload.

An embodiment of the present invention provides a signal consisting of a bit stream, where the signal includes:

a synchronization pattern, being of a length, the length of the synchronization pattern is an integer multiple of 32 bits and the synchronization pattern is formed by connecting 32-bit unit gene blocks, a burst delimiter (BD), a burst overhead, adapted to detect bit-error-ratio, an network unit (ONU) identifier, and a real time state report of an ONU, a transmission convergence overhead, and a payload.

With the uplink/downlink burst data designed in the embodiments of the invention, spectrum components of its synchronization pattern are relatively uniformly distributed throughout the spectrum interval to thereby allow the use of a less complex equalizer at the reception end of the high-speed PON system.

DETAILED DESCRIPTION

The technical solutions in the embodiments of the present invention will be described below clearly and fully with reference to the drawings in the embodiments of the present invention. Evidently, the described embodiments are only a part but not exhaustive of embodiments of the present invention. Any other embodiments which will occur to those ordinarily skilled in the art in light of the embodiments in the present invention here without any inventive effort shall fall within the scope of the present invention.

Figures 1, 2:
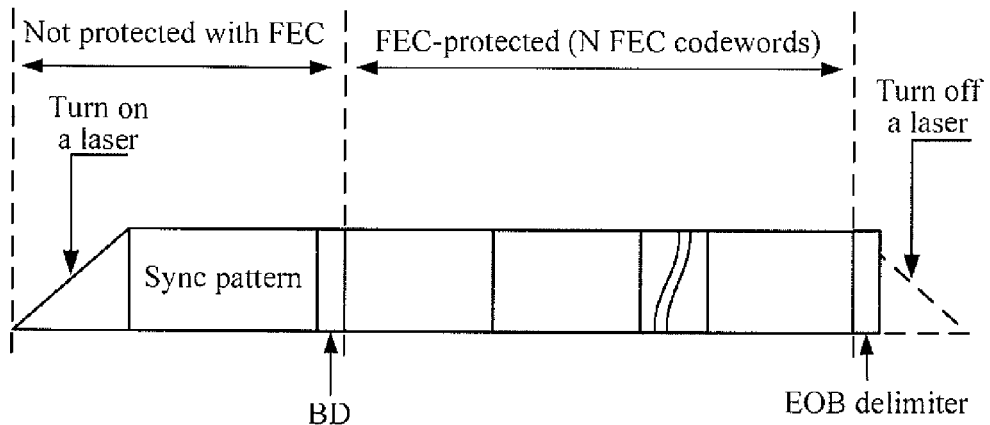
FIG. 1 illustrates a structure of burst data transmitted in the uplink according to an embodiment of the invention.
FIG. 2 illustrates gene blocks of the synchronization pattern according to an embodiment of the present invention.

A technical solution will be described in an embodiment of the present invention taking a 10G Ethernet Passive Optical Network (10G EPON) system as an example. In the structure of burst data transmitted in the uplink according to the embodiment of the present invention as illustrated in FIG. 1, the uplink burst data transmitted from an ONU include a Synchronization pattern, a BD, an FEC-protected Ethernet data and an EOB delimiter. In particular, the synchronization pattern and the BD are not protected with FEC encoding, and FEC codewords, i.e. the FEC-protected Ethernet data, follow the BD. The BD indicates the start of the FEC-protected data in the burst. The synchronization pattern is used for an OLT to perform an AGC and a clock recovery on a received burst frame.

The synchronization pattern designed in an embodiment of the present invention includes an extended 66-bit gene block. FIG. 2 presents a set of gene blocks, i.e. elementary gene blocks, for generation of the synchronization pattern described in the embodiment of the present invention. The elementary gene blocks illustrated in FIG. 2 are subjected to an inversion or mirroring or cyclic shift process, which results in gene blocks of a new design synchronization pattern. The synchronization pattern designed in the embodiment of the present invention consists of these gene blocks connected end-to-end.

More gene blocks for generation of the synchronization pattern described in the present invention can be derived from the elementary gene blocks in FIG. 2. For example, inversion of the elementary gene block 1 results in the following gene block:

0100000010111111011110011101011000010111 0001-101101001000 1001100101;

A mirror process on the elementary gene block 1 results in the following gene block:

0101100110111101101001001110001011110010 10001-100001000000 1011111101;

The mirroring process can be taken for as a reversion process, for example, the mirroring process on ABCD results in DCBA.

A cyclic shift on the elementary gene block 1 results in the following gene block:

0101111110100000010000110001010011110100 0011-1001001011011 1011001101.

The above process is a one-bit cyclic shift process. A cyclic shift process of any number of bits is possible in practice.

In the same way, more gene blocks can be derived from an inversion, mirroring or cyclic shift on the elementary gene blocks presented in FIG. 2. A gene block can still be derived from a cyclic shift on an elementary gene block that has been subjected to an inversion or mirroring process.

An elementary gene block may include:

101111110100000010000110001010011110100 01110-010010110111 0110011010 or 101010011101000111001001011011101100110 1010-101111100000 1000011000 or 100110011101000111001001011011101100110 1010-101111100000 1000011000 or 100101011110100011100100101101110110011 01010-101111100000 1000011000 or 101000111101000111001001011011101100110 1010-101111100000 1000011000 or 101001111010001110010010101011101100110 10101-111101100000 1000011000 or 10100111101000111001001011011101100110101001-
111101100000 1000011000 or 10100111101000111001001011011111011001101010-
111111000000 1000011000 or 10100111101000111001001011011101100110101 01-
1111101000000 1000011000.

The elementary gene blocks presented in FIG. 2 and the gene blocks derived from the elementary gene blocks are characterized in common as the following:

The synchronization pattern designed according to the embodiment of the present invention is of a length which is an integer multiple of 66 bits, and the synchronization pattern includes end-to-end connection of a 66-bit gene block.

The synchronization pattern designed according to the embodiment of the present invention is a direct current balance sequence with the same run lengths of zeros and ones, where the maximum run length is 6.

The on/off of the laser at a transmission end shall be controlled by the ONU in the existing 10G-EPON system. When the ONU has no data for transmission, the laser of the ONU shall be turned off in order to avoid an influence on transmission from an adjacent ONU. The switch of the laser is controlled with a data detector, and the laser is turned on by the ONU when the data detector detects arrival of data for transmission.

Figure 3:
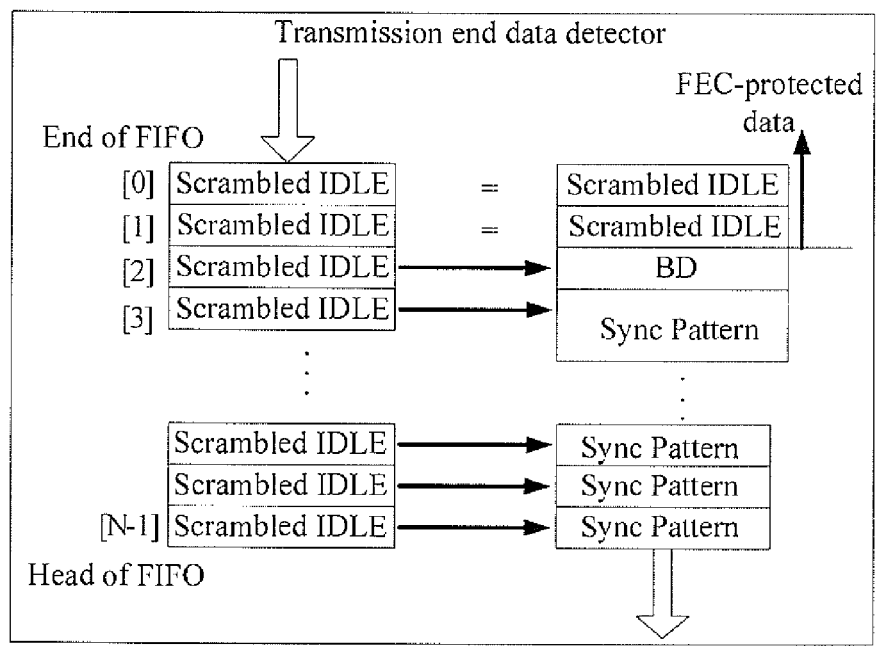
FIG. 3 illustrates a diagram of a change of contents in an first-in-first-out (FIFO) queue according to an embodiment of the present invention.

A method for providing uplink burst data will be introduced with respect to a change of contents in an FIFO queue according to an embodiment of the present invention in FIG. 3.

The FIFO queue before and after substitution can be represented in the table below:

| FIFO serial number | Value before substitution | Value after substitution | Descriptions |
| --- | --- | --- | --- |
| N-1 | Scrambled IDLE | Scrambled IDLE | The value is scrambled IDLE at the end of the original FIFO queue |
| N-2 | Scrambled IDLE | Scrambled IDLE | The value is scrambled IDLE at the end of the original FIFO queue |
| N-3 | Scrambled IDLE | BD | Substituted by the BD |
| N-4 | Scrambled IDLE | 0x 4 BF 40 18 E5 C5 49 BB 59 | Substituted by the 66-bit gene block of the synchronization pattern |
| ... | ... | ... | The same as the above |
| 1 | Scrambled IDLE | 0x 4 BF 40 18 E5 C5 49 BB 59 | The same as the above |
| 0 | Scrambled IDLE | 0x 4 BF 40 18 E5 C5 49 BB 59 | The same as the above |

(The values after substitution are represented in a hexadecimal form)

The serial number 0 of the FIFO queue denotes the start of the queue, and N-1 denotes the end of the queue. The values before and after substitution each are in units of block, i.e. an integer multiple of 66 bits.

When data for transmission arrives at the data detector of the ONU, contents of the two FIFO blocks [N-1] and [N-2] at the end of the queue (IDLE) keep unchanged, contents of the FIFO block [N-3] are substituted by the BD, and contents of the FIFO blocks [N-4] to [0] are substituted by the synchronization pattern designed according to the present invention. N denotes the length of the queue, which is dependent upon the synchronization time. Then, the data in the queue is transmitted out sequentially by the rule of FIFO.

Due to the rule of FIFO for the FIFO queue, the synchronization pattern of the uplink burst data is firstly provided, for example, the synchronization pattern includes N-3 blocks of 66-bit genes 1 in FIG. 2 according to the embodiment of the present invention, i.e. N-3 blocks of 10111111010000001000011000101001111010001110-01001011011101100110 10 (a hexadecimal value of 0x 4 BF 40 18 E5 C5 49 BB 59), which are connected end-to-end. Then the BD of the uplink burst data is provided. Thereafter FEC-protected data in the uplink burst data is provided. Finally the end of BD of the uplink burst data is provided. When the contents in the FIFO queue of the data detector of the ONU are IDLE, the ONU transmission end will turn off the laser. Transmission of the uplink burst data is finished.

Evidently, in the above descriptions, the providing, by the ONU, each part of the uplink burst data means that the ONU sends each of the parts to the OLT. The parts sent by the ONU in sequence form the uplink burst data. The parts herein include: the synchronization pattern, the BD, the FEC-protected data, and the EOB delimiter.

Figure 4:
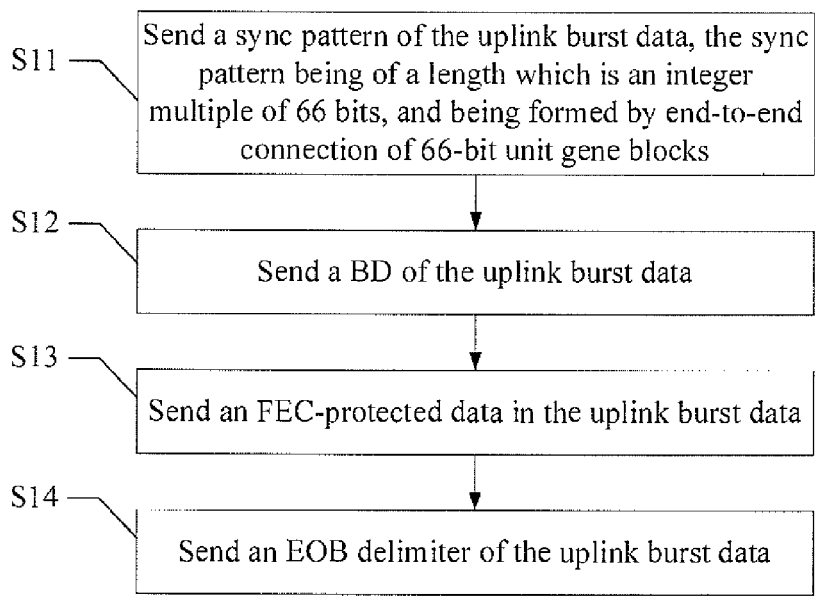
FIG. 4 is a schematic process flow diagram which illustrates a method for sending uplink burst data in a PON system according to an embodiment of the present invention.

Referring to FIG. 4, an embodiment of the present invention provides a method for providing uplink burst data in a PON system, i.e. a method for sending uplink burst data in a PON system, and the method includes the following steps:

Step 11: sending a synchronization pattern of the uplink burst data, the length of the synchronization pattern is an integer multiple of 66 bits and the synchronization pattern is formed by connecting 66-bit unit gene blocks;

Step 12: sending a BD of the uplink burst data;

Step 13: sending an FEC-protected data in the uplink burst data; and

Step 14: sending an EOB delimiter of the uplink burst data.

Thus, the uplink burst data generated in the embodiment is a signal includes a bit stream, and the signal includes the synchronization pattern, the BD, the FEC-protected data and the end of BD, formed from end-to-end connection of 66-bit unit gene blocks, and is of a length which is an integer multiple of 66 bits. The synchronization pattern is a direct current balance sequence with the same run lengths of zeros and ones in the binary codes, where the maximum run length is 6. The 66-bit gene block in use can be any elementary genes block illustrated in FIG. 2 or be derived from an inversion or mirroring or cyclic shift process on the elementary gene block, and the gene block can still be derived from a cyclic shift on the elementary gene block that has been subjected to an inversion or mirroring process.

After the OLT reception end receives the burst data transmitted from the ONU, the OLT reception end can perform a clock recovery and an AGC on the received data by utilizing transition between zeros and ones of the burst synchronization pattern in the burst data frame.

The synchronization pattern designed in the embodiment of the present invention is a direct current balance sequence with the same run lengths of zeros and ones, where the maximum run length is 6, so that a peak detector at the reception end can detect an approximately 100% peak level of the received signal.

Figure 5:
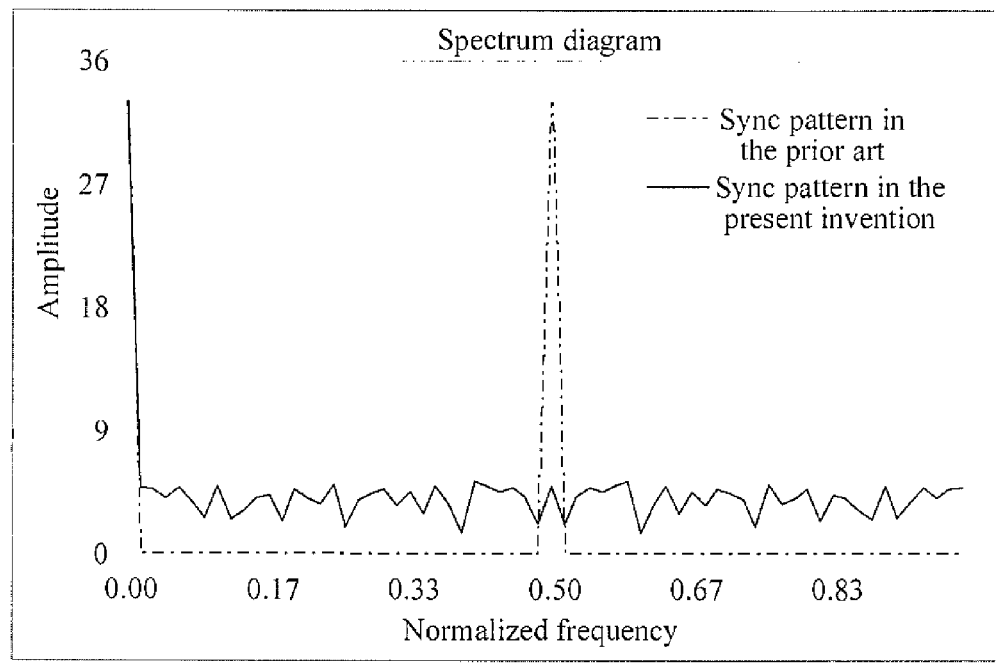
FIG. 5 illustrates a spectrum diagram of a synchronization pattern generated from end-to-end connection of the gene 1.

The spectrum of the synchronization pattern designed in the embodiment of the present invention is relatively uniformly distributed throughout the spectrum interval to thereby allow the use of a less complex equalizer at the OLT reception end. FIG. 5 illustrates a spectrum diagram of the synchronization pattern generated from end-to-end connection of the genes 1. As can be apparent from FIG. 5, the spectrum of the synchronization pattern of the uplink burst data in the embodiment appears as the solid line which is relatively uniform throughout the spectrum interval. The dotted lines represent the spectrum diagram of the synchronization pattern in the prior art in which spectrum components are concentrated at high frequency. As can be seen from the figure, a good effect has been achieved in the embodiment.

Figure 6:
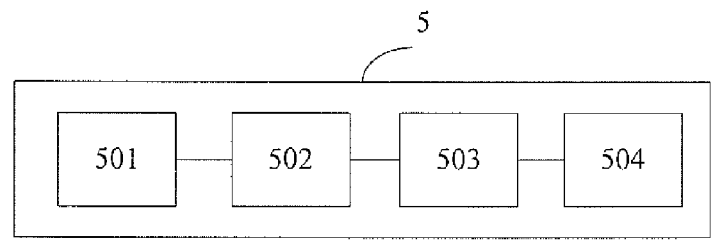
FIG. 6 illustrates a block diagram of a device for providing uplink burst data in a PON system according to an embodiment of the present invention.

Also an embodiment of the present invention provides a device for providing uplink burst data in a PON system as illustrated in FIG. 6, where the device 5 includes:

a unit 501 adapted to provide a synchronization pattern of the uplink burst data, the length of the synchronization pattern is an integer multiple of 66 bits and the synchronization pattern is formed by connecting 66-bit unit gene blocks;

a unit 502 adapted to provide a BD of the uplink burst data;

a unit 503 adapted to provide an FEC-protected data in the uplink burst data; and a unit 504 adapted to provide an EOB delimiter of the uplink burst data.

In particular, the synchronization pattern provided by the unit adapted to provide the synchronization pattern of the uplink burst data is a direct current balance sequence with the same run lengths of zeros and ones in its binary codes, where the maximum run length is 6. The 66-bit gene block in use can be any elementary gene block illustrated in FIG. 2 or be derived from an inversion or mirroring or cyclic shift process on the elementary gene block, and the gene block can still be derived from a cyclic shift on the elementary gene block that has been subjected to an inversion or mirroring process.

Figure 7:
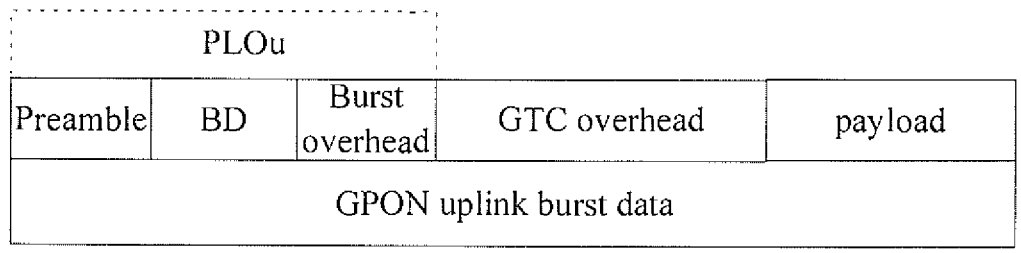
FIG. 7 illustrates a structure of burst data transmitted in the uplink according to a second embodiment of the present invention.

A technical solution will be described in a second embodiment of the present invention taking a GPON system as an example. In the structure of burst data transmitted in the uplink according to the second embodiment of the present invention as illustrated in FIG. 7. The uplink burst data transmitted from an ONU include a Physical Layer Overhead upstream (PLOu), a Gigabit-Capable Passive Optical Network (GPON) Transmission Convergence (GTC) overhead, and a GTC payload. The PLOu includes a Synchronization pattern, a BD, and a burst overhead. The Synchronization pattern and BD are set by parameters of Upstream_Overhead. The Upstream_Overhead is sent by an OLT. The synchronization pattern is used for the OLT to perform an AGC and a clock recovery on a received burst frame.

Figure 8:
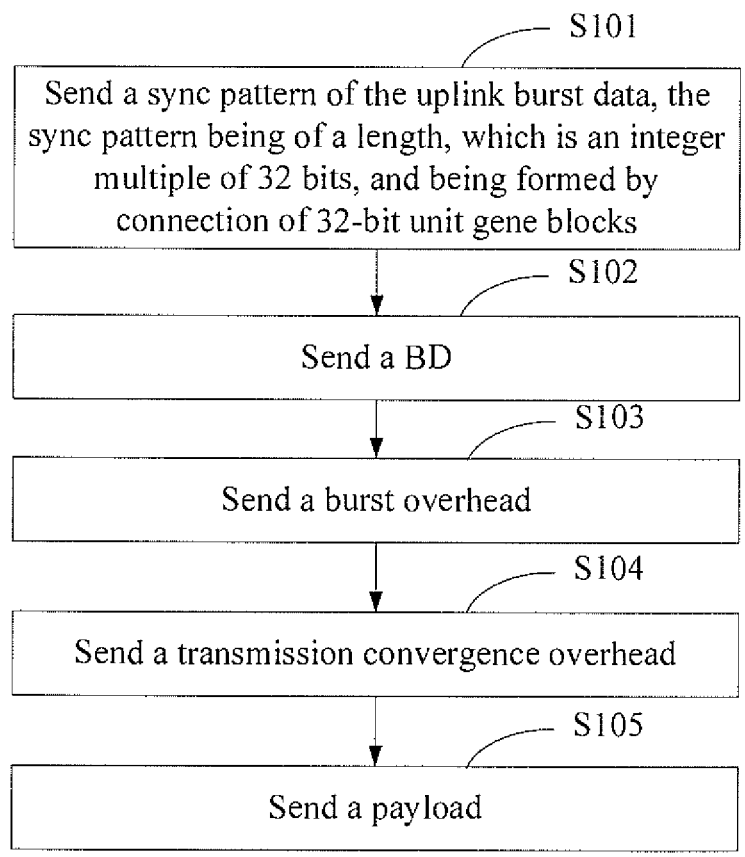
FIG. 8 is a process flow diagram which illustrates a method for sending uplink burst data according to the second embodiment of the present invention.

In one embodiment of the present invention disclose a method for sending uplink burst data in a PON, as illustrated in FIG. 8.

In step S101, a synchronization pattern of the uplink burst data is sent, the length of the synchronization pattern is an integer multiple of 32 bits and the synchronization pattern is formed by connecting 32-bit unit gene blocks.

The synchronization pattern designed in an embodiment of the present invention includes an extended 32-bit gene block. Chart 1 presents a set of gene blocks, i.e. elementary gene blocks, for generation of the synchronization pattern described in the embodiment of the present invention. The elementary gene blocks illustrated in Chart 1 are subjected to an inversion or mirroring or cyclic shift process, which results in gene blocks of a new design synchronization pattern. The synchronization pattern designed in the embodiment of the present invention includes these gene block connected end-to-end.

CHART 1

Gene blocks of the synchronization pattern (32-bit)

| | 32-bit gene block |
|---|---|
| Gene 10 | 10111011010100100001111000100110 |
| Gene 11 | 00010011010011110111010000101011 |
| Gene 12 | 11010011011100101011110100010000 |
| Gene 13 | 11110001001101011101101010010000 |
| Gene 14 | 10111011110010110010001101010000 |
| Gene 15 | 10101100010011010011110111010000 |
| Gene 16 | 10001011110101001101100010110000 |
| Gene 17 | 11110110101001000100101011110000 |
| Gene 18 | 10010101101110101100100011110000 |
| Gene 19 | 11101100101000100101011011110000 |

More gene blocks for generation of the synchronization pattern described in the present invention can be derived from the elementary gene blocks in Chart 1. For example, inversion of the elementary gene block 10 results in the following gene block: 01000100101011011110000111011001

A mirror process on the elementary gene block 10 results in the following gene block: 01100100011110000100101011011101;

The mirroring process can be taken for as a reversion process, for example, the mirroring process on ABCD results in DCBA.

A cyclic shift on the elementary gene block 10 results in the following gene block: 11101101010010000111100010011010.

The above process is a two-bit cyclic shift process. A cyclic shift process of any number of bits is possible in practice.

In the same way, more gene blocks can be derived from an inversion, mirroring or cyclic shift on the elementary gene blocks presented in Chart 1. A gene block can still be derived from a cyclic shift on an elementary gene block that has been subjected to an inversion or mirroring process.

The elementary gene blocks presented in Chart 1 and the gene blocks derived from the elementary gene blocks are characterized in common as the following:

The synchronization pattern designed according to the embodiment of the present invention is of a length which is an integer multiple of 32 bits, and the synchronization pattern consists of end-to-end connection of a 32-bit gene block.

The synchronization pattern designed according to the embodiment of the present invention is a direct current balance sequence with the same run lengths of zeros and ones, where the maximum run length is 4.

The OLT according to the system parameters choose a gene block from chart 1. In an example use a 32-bit sequence like 0x BB52 1E26, i.e. 1011 1011 0101 0010 0001 1110 0010 0110. An OLT transmission end defines the sequence in Upstream_Overhead, and the Upstream_Overhead pre-defined by the OLT is embedded in downstream PLOAMd. The ONU sends the synchronization pattern of the uplink burst data according to the synchronization pattern in the Upstream_Overhead in the received PLOAMd. The sent synchronization pattern according to the embodiment of the present invention is a direct current balance sequence with the same run lengths of zeros and ones, where the maximum run length is 4.

In step S102, a BD is sent.

In step S103, a burst overhead is sent. The burst overhead is adapted to detect bit-error-ratio, an identifier ONU-ID, and a real time state report of an ONU.

In step S104, a transmission convergence overhead is sent.

In step S105, a payload is sent.

The sending of the uplink burst data is finished, and a signal consists of a bit stream is generated at the same time.

After the OLT reception end receives the burst data transmitted from the ONU, the OLT reception end can perform a clock recovery and an AGC on the received data by utilizing transition between zeros and ones of the burst synchronization pattern in the burst data frame.

Figure 9:
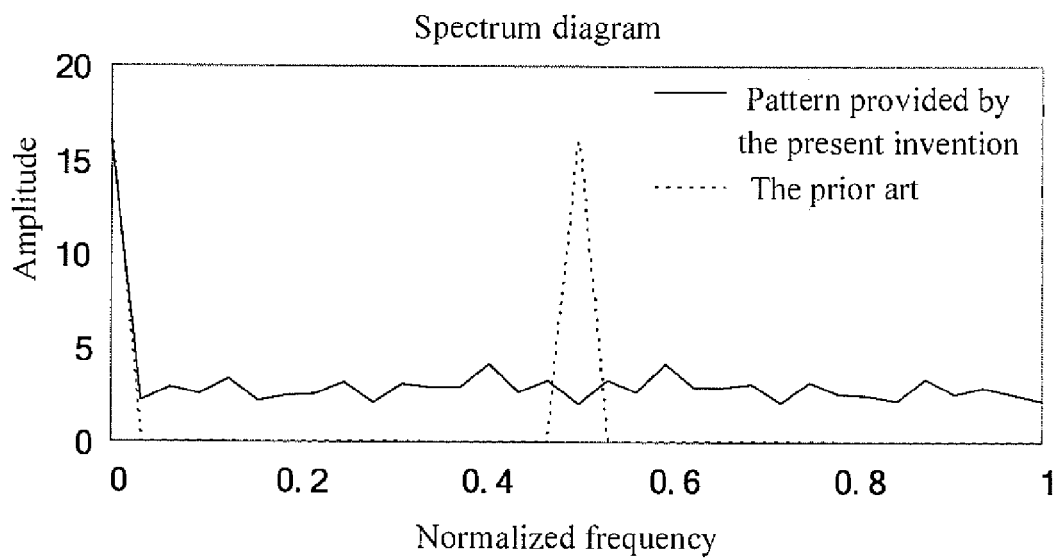
FIG. 9 illustrates a spectrum diagram of the gene 10.

The spectrum of the synchronization pattern designed in the embodiment of the present invention is relatively uniformly distributed throughout the spectrum interval to thereby allow the use of a less complex equalizer at the OLT reception end. FIG. 9 illustrates a spectrum diagram of the genes 10 from Chart 1 according to the embodiment of the present invention. As can be apparent from FIG. 9, the spectrum of the synchronization pattern of the uplink burst data in the embodiment appears as the solid line which is relatively uniform throughout the spectrum interval. The dotted lines represent the spectrum diagram of the synchronization pattern in the prior art in which spectrum components are concentrated at high frequency. As can be seen from the FIG. 9, a good effect has been achieved in the embodiment. According to the embodiment of the present invention, a peak detector at the reception end can detect an approximately 100% peak level of the received signal.

Figure 10:
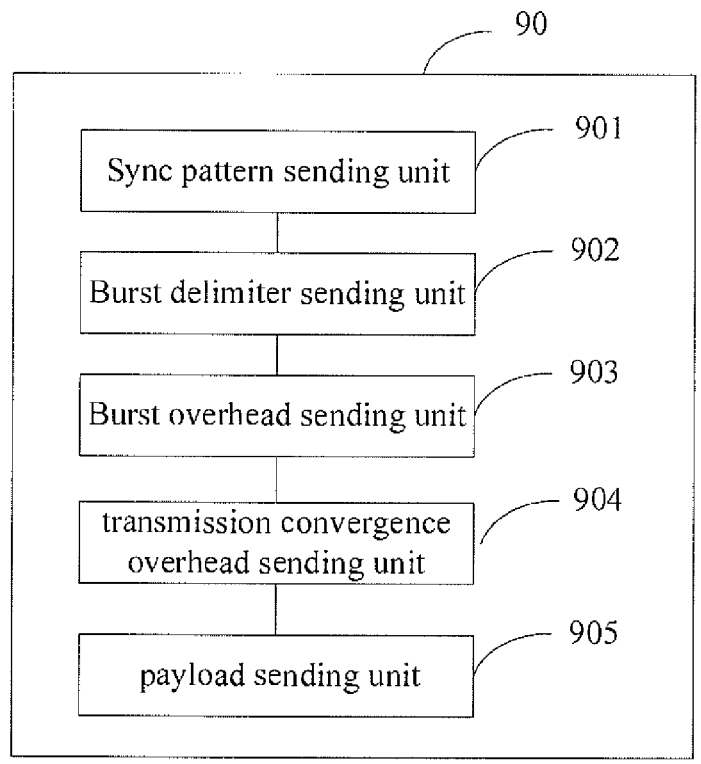
FIG. 10 illustrates a block diagram of a device for sending uplink burst data according to the second embodiment of the present invention.

Also the second embodiment of the present invention provides a device for providing uplink burst data in a PON system as illustrated in FIG. 10, the device 90 includes: a synchronization pattern sending unit 901, a BD sending unit 902, a burst overhead sending unit 903, a transmission convergence overhead sending unit 904, and a payload sending unit 905.

The synchronization pattern sending unit 901 is adapted to send a synchronization pattern. The length of the synchronization pattern is an integer multiple of 32 bits and the synchronization pattern is formed by connecting 32-bit unit gene blocks.

The synchronization pattern sent by the synchronization pattern sending unit 901 is a direct current balance sequence with the same run lengths of zeros and ones, where the maximum run length is 4. The 32-bit gene block in use can be any elementary genes block illustrated in Chart 1 or be derived from an inversion or mirroring or cyclic shift process on the elementary gene block, and the gene block can still be derived from a cyclic shift on the elementary gene block that has been subjected to an inversion or mirroring process.

The BD sending unit 902 is adapted to send a BD.

The burst overhead sending unit 903 is adapted to send a burst overhead, and the burst overhead is adapted to detect bit-error-ratio, an identifier ONU-ID, and a real-time state report of an ONU.

The transmission convergence overhead sending unit 904 is adapted to send a transmission convergence overhead.

A payload sending unit 905 is adapted to send a payload.

The spectrum of the synchronization pattern designed by the device according to the embodiment of the present invention is relatively uniformly distributed throughout the spectrum interval to thereby allow the use of a less complex equalizer at the reception end of a high-speed PON system.

The foregoing descriptions are merely illustrative of the several embodiments of the present invention, and those skilled in the art can make various modifications or variations of the present invention in light of the disclosure of the application without departing from the spirit and scope of the present invention.

What is claimed is:

1. A method for sending uplink burst data in a passive optical network (PON) system, the method comprising:
    sending a synchronization pattern of the uplink burst data, wherein a length of the synchronization pattern is 66 bits; wherein the 66-bit synchronization pattern represented in a binary form is:
    10111111010000001000011000101001111101000 11-10010010110111011001 1010;
    sending a burst delimiter (BD) of the uplink burst data;
    sending forward error correction (FEC) protected data in the uplink burst data; and
    sending an end of burst (BOB) delimiter of the uplink burst data.

2. A device for providing uplink burst data in a passive optical network (PON) system, the device comprising:
    a unit adapted to provide a synchronization pattern of the uplink burst data, wherein a length of the synchronization pattern is 66 bits; wherein the 66-bit synchronization pattern represented in a binary form is:
    10111111010000001000011000101001111010001110-0100101101110110011010;
    a unit adapted to provide a burst delimiter (BD) of the uplink burst data;
    a unit adapted to provide forward error correction (FEC)-protected data in the uplink burst data; and
    a unit adapted to provide an end of burst (EOB) delimiter of the uplink burst data.

* * * * *